(12) United States Patent
Okuda

(10) Patent No.: US 9,543,806 B2
(45) Date of Patent: Jan. 10, 2017

(54) WHEEL-AXLE GENERATOR

(71) Applicant: Katsuji Okuda, Ayase (JP)

(72) Inventor: Katsuji Okuda, Ayase (JP)

( * ) Notice: Subject to any disclaimer, the term of this patent is extended or adjusted under 35 U.S.C. 154(b) by 0 days.

(21) Appl. No.: 14/369,608

(22) PCT Filed: Dec. 27, 2012

(86) PCT No.: PCT/JP2012/084002
§ 371 (c)(1),
(2) Date: Jun. 27, 2014

(87) PCT Pub. No.: WO2013/100113
PCT Pub. Date: Jul. 4, 2013

(65) Prior Publication Data
US 2015/0008799 A1 Jan. 8, 2015

(30) Foreign Application Priority Data

Dec. 27, 2011 (JP) .................................. 2011-290726
May 22, 2012 (JP) .................................. 2012-130239

(51) Int. Cl.
*H02K 1/18* (2006.01)
*H02K 7/18* (2006.01)
(Continued)

(52) U.S. Cl.
CPC ........... *H02K 7/1846* (2013.01); *B60B 35/002* (2013.01); *B60B 35/02* (2013.01); *B60B 35/18* (2013.01);
(Continued)

(58) Field of Classification Search
CPC .......... B60B 35/00; B60B 35/02; B60B 37/00; B61C 9/46; H02K 7/003; H02K 7/085; H02K 7/1846; H02K 5/1735; B60Y 2200/11
(Continued)

(56) References Cited

U.S. PATENT DOCUMENTS 2,638,557 A  *  5/1953  Longert ...................... 310/75 R
3,921,741 A  *  11/1975  Garfinkle et al. ......... 180/206.2
(Continued)

FOREIGN PATENT DOCUMENTS

CN   101056031 A   10/2007
JP   60-107334 U   7/1985
(Continued)

OTHER PUBLICATIONS

International Search Report for PCT/JP2012/084002 dated Feb. 19, 2013.
(Continued)

*Primary Examiner* — Terrance Kenerly
*Assistant Examiner* — Rashad Johnson
(74) *Attorney, Agent, or Firm* — Sughrue Mion, PLLC

(57) ABSTRACT

A wheel-axle generator equipped with a rotor configured to rotate with rotation of a wheel and a stator arranged around the rotor. The rotor is fixed to a concave portion that opens toward a vehicle outside of a tire wheel of a wheel. An arm member that has one end attached to a wheel-axle housing or a steering knuckle), that extends so as to stride over a wheel, and that, on a side of an outer surface of the wheel, further extends parallel to the outer surface of the wheel up to a central portion of the wheel. The stator is annularly arranged so as to surround the rotor and is provided on the other end side of the arm member. This arrangement provides space for accommodating a generator without shortening a wheel axle etc. and attaching the generator easily.

1 Claim, 8 Drawing Sheets

(51) Int. Cl.
*B60B 35/18* (2006.01)
*B60B 35/00* (2006.01)
*B60B 35/02* (2006.01)
*H02K 5/173* (2006.01)
*B61C 9/46* (2006.01)
*H02K 7/00* (2006.01)
*H02K 7/08* (2006.01)

(52) U.S. Cl.
CPC .......... *H02K 5/1735* (2013.01); *B60Y 2200/11* (2013.01); *B61C 9/46* (2013.01); *H02K 7/003* (2013.01); *H02K 7/085* (2013.01)

(58) Field of Classification Search
USPC   310/67 R, 67 C, 75 C, 67 A, 255, 265, 266, 310/267; 105/35, 52, 53; 290/9, 45
See application file for complete search history.

(56) References Cited

U.S. PATENT DOCUMENTS

| | | | | |
|---|---|---|---|---|
| 4,777,790 A * | 10/1988 | Raasch | ............ | 57/263 |
| 4,782,908 A * | 11/1988 | Trema | ............... | B62K 25/283 |
| | | | | 180/226 |
| 6,046,518 A * | 4/2000 | Williams | ............ | B60K 7/0007 |
| | | | | 310/114 |
| 6,118,196 A * | 9/2000 | Cheng-Yon | ............... | B62J 6/12 |
| | | | | 310/164 |
| 6,871,543 B2 * | 3/2005 | Rothamel | ............... | 73/462 |
| 7,023,122 B2 * | 4/2006 | Gang | ............... | B62J 6/06 |
| | | | | 310/181 |
| 2004/0080223 A1 * | 4/2004 | Shimizu | ............... | B60K 7/0007 |
| | | | | 310/75 C |
| 2004/0084955 A1 * | 5/2004 | Denby | ............... | B62K 25/02 |
| | | | | 301/124.2 |
| 2006/0087182 A1 * | 4/2006 | Sugiyama | ............ | B60K 7/0007 |
| | | | | 310/75 C |
| 2006/0137926 A1 * | 6/2006 | Taniguchi et al. | ............ | 180/65.5 |
| 2007/0257570 A1 * | 11/2007 | Walter | ............ | B60K 7/0007 |
| | | | | 310/67 R |
| 2009/0026035 A1 * | 1/2009 | Boffelli et al. | ............ | 192/48.2 |
| 2009/0066084 A1 * | 3/2009 | Moyles | ............ | F02N 11/04 |
| | | | | 290/32 |
| 2010/0071673 A1 * | 3/2010 | Prior | ............ | F02B 33/38 |
| | | | | 123/559.3 |
| 2011/0048830 A1 * | 3/2011 | Radtke et al. | ............ | 180/205 |
| 2011/0061956 A1 * | 3/2011 | Gilmore | ............ | B60K 7/0007 |
| | | | | 180/65.51 |
| 2011/0115343 A1 * | 5/2011 | Walser | ............ | B60K 7/0007 |
| | | | | 310/67 R |
| 2011/0121573 A1 * | 5/2011 | Bialor | ............ | F03B 13/00 |
| | | | | 290/53 |
| 2012/0242197 A1 * | 9/2012 | Fischer | ............ | H02K 5/124 |
| | | | | 310/67 R |
| 2014/0034402 A1 * | 2/2014 | Woolmer | ............ | H02K 5/18 |
| | | | | 180/65.51 |

FOREIGN PATENT DOCUMENTS

| | | |
|---|---|---|
| JP | 2-10127 U | 1/1990 |
| JP | 2004-224069 A | 8/2004 |
| JP | 2007-129805 A | 5/2007 |
| JP | 2008-044588 A | 2/2008 |

OTHER PUBLICATIONS

Communication dated Nov. 27, 2015, issued by the State Intellectual Property Office of the P.R.C. in corresponding Chinese Application No. 201280064569.3.

* cited by examiner

WHEEL-AXLE GENERATOR

CROSS REFERENCE TO RELATED APPLICATIONS

This application is a National Stage of International Application No. PCT/JP2012/084002 filed Dec. 27, 2012, claiming priority based on Japanese Patent Application Nos. 2011-290726, filed Dec. 27, 2011 and 2012-130239, filed May 22, 2012, the contents of all of which are incorporated herein by reference in their entirety.

TECHNICAL FIELD

The present invention relates to a wheel-axle generator (hereafter, merely referred to as a generator) configured to generate electricity by utilizing the rotation of a wheel of an automobile.

BACKGROUND ART

Generally, in automobiles with a gasoline engine or automobiles with a diesel engine, a generator is rotated so as to generate electricity with pulleys and a belt in conjunction with rotation motion by the crank mechanism of an engine, and the generated electricity is accumulated in a storage battery. Further, in railroad vehicles, in order to cover electric power for railroad passenger carriages which run by being towed with a locomotive engine, heretofore, the rotation of a wheel is transmitted to a generator via pulleys and a belt or gears and a universal joint, whereby the generator is rotated so as to generate electricity, and the generated electricity is used as it is, or the surplus is accumulated in a storage battery.

Incidentally, in the automobiles, except special electric automobiles, with a single motive power, a four-wheeled vehicle runs with four wheels, a three-wheeled vehicle runs with three wheels, and a two-wheeled vehicle runs with two wheels. Although the utilization of the rotation of this wheel enables electricity generation, conventionally, the installation of a generator on a wheel of an automobile has not been carried out generally due to the restriction in space.

FIG. 13 is a cross-sectional view for explaining a structure in a conventional attaching portion of a wheel (rear wheel) of a vehicle, herein an automobile.

As shown in FIG. 13, the wheel of an automobile is constituted with a tire wheel 4, a rim L disposed integrally on its outer peripheral surface, a tire T installed on the rim L, a tire drum 3 fixed to the tire wheel 4 with, for example, bolts and nuts (hub bolts 29 and hub nuts 30), and a wheel-axle flange 1a arranged to face the tire drum 3.

Here, for example, the tire wheel 4 of a rear wheel is coupled integrally to a rear wheel axle 2a, and the tire drum 3, the tire wheel 4, and the tire T are rotated with the rotation of the rear wheel axle 2a. In order to generate electricity by utilizing the rotation of a wheel axle (rear wheel axle 2a) of such an automobile, on a rotatable wheel (rear wheel) side and on a stationary side (collectively called as a wheel-axle portion, and a wheel and a wheel-axle portion are collectively called as an attaching portion of a wheel) which support the wheel, a rotor and a stator of a generator may be attached, respectively, so as to face each other.

For example, in the case where a generator is attached to a wheel-axle 2a portion of a rear wheel of a vehicle, if the generator is attached by reducing the length of the wheel-axle housing 1 and the rear wheel axle 2a, or a suspension, the generator can be installed without protruding from the rear wheel. In this case, the reduction of the length of the wheel-axle housing 1 and the rear wheel axle 2a, or the suspension causes a problem in which the running of the vehicle becomes unstable. Therefore, when the generator is attached without reducing their lengths, the generator protrudes from the vehicle body. However, on such a portion protruding from the vehicle body, it is sufficient that a tire house (fender) is mounted and side mirrors are extended to the left and right by a length corresponding to the portion.

Nevertheless, conventionally, even if a generator is attached to a vehicle axle to generate electricity, it has been difficult to find a generator suitable for the axle.

SUMMARY OF INVENTION

Technical Problem

An object of the present invention is to provide a generator capable of being easily attached to an attaching portion of a vehicle wheel and generating electricity by utilizing the rotation of the wheel.

Solution to Problem

The present invention is a wheel-axle generator equipped with a rotor configured to rotate with rotation of a wheel and a stator arranged around the rotor, including: the rotor fixed to a concave portion that opens toward a vehicle outside of a tire wheel of a wheel; and an arm member that has one end attached to a wheel-axle housing or a steering knuckle, that extends so as to stride over a wheel, and that, on a side of an outer surface of the wheel, further extends parallel to the outer surface of the wheel up to a central portion of the wheel; wherein the stator annularly arranged so as to surround the rotor is provided on the other end side of the arm member.

The present invention is a wheel-axle generator equipped with a rotor configured to rotate with rotation of a wheel and a stator attached to a spindle coupled concentrically to a wheel axle of the wheel, including: the rotor fixed to a concave portion that opens toward a vehicle outside of a tire wheel of the wheel, and the stator attached to the spindle and annularly arranged so as to surround the rotor.

The present invention is a wheel-axle generator equipped with a rotor configured to rotate with rotation of a wheel and a stator attached to a spindle coupled concentrically to a wheel axle of the wheel, including: the rotor fixed to a concave portion that opens toward a vehicle outside of a tire wheel of the wheel and annularly arranged so as to surround the stator, and the stator attached to the spindle and arranged so as to be surrounded by the rotor.

Advantageous Effects of Invention

The generator of the present invention can be easily attached to an attaching portion of a vehicle wheel and can generate electricity by utilizing the rotation of a wheel.

DESCRIPTION OF EMBODIMENTS

Hereafter, embodiments of the present invention will be described with reference to the drawings.

Figure 1:
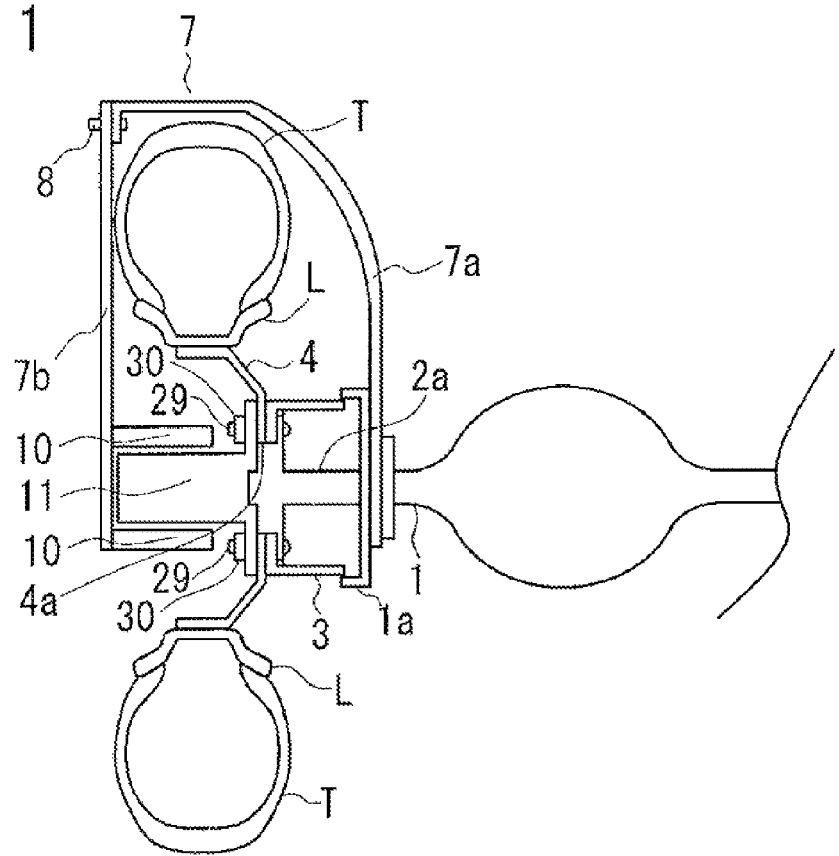
FIG. 1 is a partial cross-sectional view showing a generator attached to a rear wheel according to an embodiment of the present invention.

FIG. 1 is a partial cross-sectional view showing a wheel-axle generator (hereafter, merely referred to as a generator) attached to a rear wheel according to an embodiment of the present invention.

First, a generator used in the present embodiment will be described briefly.

The generator itself has been known conventionally, and includes a magnet and a coil, and is configured to generate electricity by utilizing, for example, a wheel-axle housing of a rear wheel and a wheel axle (rear wheel axle) adapted to rotate in it so as to transmit power in a vehicle (here, an automobile).

In the case where it is supposed that the wheel axle is replaced with an electric fan, the above structure is similar to the structure that a magnet of a rotor of a generator is mounted on an axle of a motor of the electric fan; on the other hand, a coil of a stator of the generator is mounted on a protective net of a fan of the electric fan which is disposed consecutively on a main body accommodating the motor of the electric fan; whereby electricity is generated by rotating the electric fan. Namely, similarly to this, in the generator according to the present embodiment, for example, the rotor is mounted on a rotating wheel axle; on the other hand, the stator is mounted on a stationary portion configured to support the wheel axle at the periphery of the rotating wheel axle; whereby electricity is generated with the rotation of a wheel.

Figure 13:
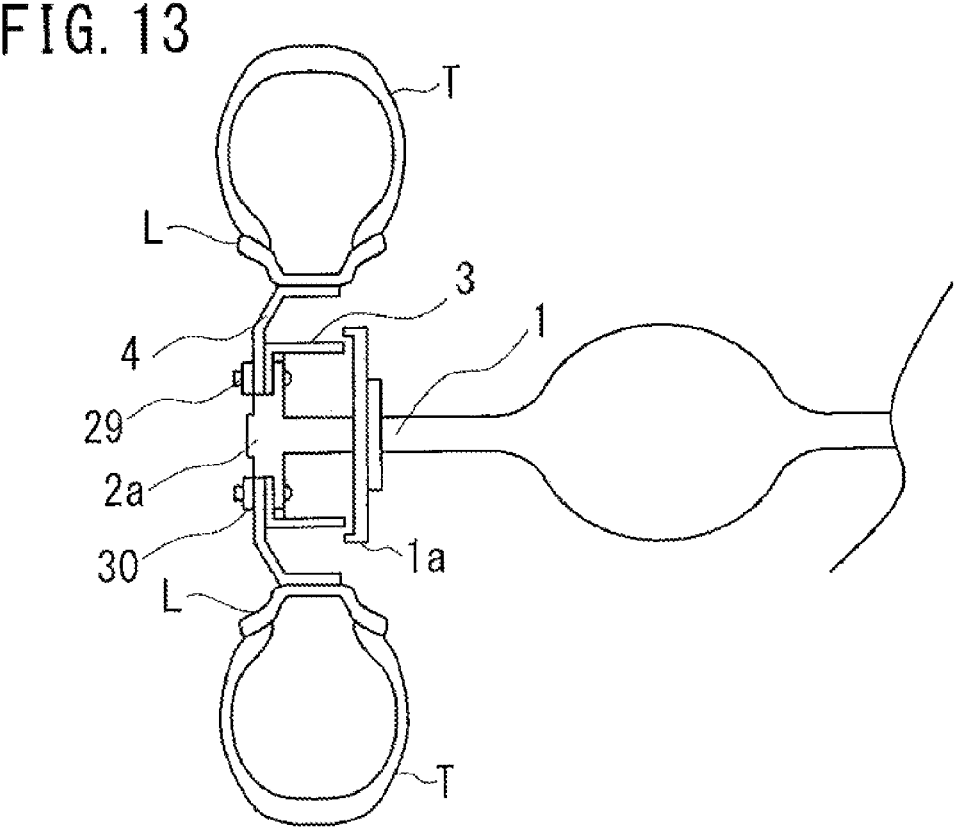
FIG. 13 is cross-sectional view for explaining a structure of an attaching portion of the conventional rear wheel.

A portion of a rear wheel according to the present embodiment has not a change in the basic structure of the portion of the conventional rear wheel shown in FIG. 13. That is, to a wheel-axle housing 1 of the rear wheel, an annular rim L to which a tire T is attached, and a tire wheel 4 which is fixed to an inner peripheral side of the rim L and coupled to a tire drum 3 with a rotation center portion to be fixed to a rear wheel axle 2a are attached.

Next, there will be given a concrete description of attachment of a stator 10 and a rotor 11 of the generator.

In FIG. 1, a wheel axle (rear wheel axle) 2a extends from the wheel-axle housing 1 to a left side in the drawing, and its tip portion is attached integrally to the tire drum 3. As described in relation to FIG. 1, the tire drum 3 is coupled integrally to the tire wheel 4, and the tire T is attached to the rim L attached to the outer peripheral portion of the tire wheel 4.

Here, there is fixed an arm member 7 that has one end attached to the wheel-axle housing 1 at a position between a disc-shaped wheel-axle flange 1a fit into a left end, in the drawing, of the wheel-axle housing 1 and the wheel-axle housing 1, that extends toward the outside while being curved so as not to interfere with the tire T, that is, that extends so as to stride over the wheel, and that, at the outer surface side of the wheel, further extends parallel to the outer surface of the wheel up to the central portion of the wheel.

The arm member 7 includes an inside arm 7a ranging from the wheel-axle housing 1 to the vehicle outside while being curved so as not to interfere with the tire T, and a straight line-shaped outside arm 7b which is coupled integrally to the inside arm 7 with, for example, bolts and nuts 8 and is constituted with a metallic frame member extending along a wheel surface parallel to it, to the central portion of the tire wheel 4.

At the end portion side of the outside arm 7b which faces the tire wheel 4, the stator 10 constituted by being assembled with coils not shown is arranged so as to annularly surround the rotor 11 formed of a magnet which will be described later.

The rotor 11 is fixed integrally to a concave portion 4a that opens toward the vehicle outside of the tire wheel 4 with, for example, hub bolts 29 and hub nuts 30. That is, in the present embodiment, the concave portion 4a of the tire wheel 4 is utilized as an arrangement space of the rotor 11. This tire wheel 4 itself may be a conventional tire wheel. However, although its concave portion 4a is usually arranged so as to face the vehicle inside, in the present embodiment, the arrangement is made opposite to the conventional arrangement such that the concave portion 4a is arranged to face the vehicle outside. Further, at the bottom portion of the concave portion 4a, the tire wheel 4 is coupled to the tire drum 3 coupled to the rear wheel axle 2a.

Furthermore, with the configuration in which the stator 10 of the generator is attached to the wheel-axle housing 1 via the arm member 7 and the rotor 11 is attached integrally to the tire wheel 4, the rotor 11 rotates in the inside of the stator 10 along with the rotation of the rear wheel, whereby electricity is generated. At this time, by constituting the wheel-axle generator as mentioned above, without shortening the rear wheel axle 2a and the wheel-axle housing 1 or suspension in the existing automobile, and without making the generator protrude from the vehicle body to the outside, that is, the generator can be arranged within the attaching portion of the wheel.

Here, when the strength of the arm member 7 is not enough, it may happen that the stator 10 of the generator attached to the tip of the arm member 7 comes into contact with the rotor 11 during the running of a vehicle. Then, in order to make them not make contact with each other, for example, a plurality of arm members 7 is arranged radially around the attaching position to the wheel-axle housing 1, whereby the strength of the whole of the plurality of arm members 7 can be enhanced.

Furthermore, in a so-called double tire in which wheels are arranged laterally side by side, it is possible to secure a location for installing a generator. Accordingly, unless the generator is a specifically large-sized generator, it is not necessary to shorten the right and left wheel-axle housings and wheel axles, or suspension. The arm member 7 disposed consecutively on the wheel-axle housing 1 in the double tire is the same as that in the single tire. However, the width of the double tire corresponds to that of two single tires, and thus it is necessary to give consideration so as not to cause the stator 10 attached to its tip to come in contact with the rotor 11 due to vibration at the time of running. Therefore, it is desirable to reinforce the arm member 7 as compared with the case of the single tire.

Next, a description will be given of the case where a generator is installed on a front wheel of an automobile.

Figure 2:
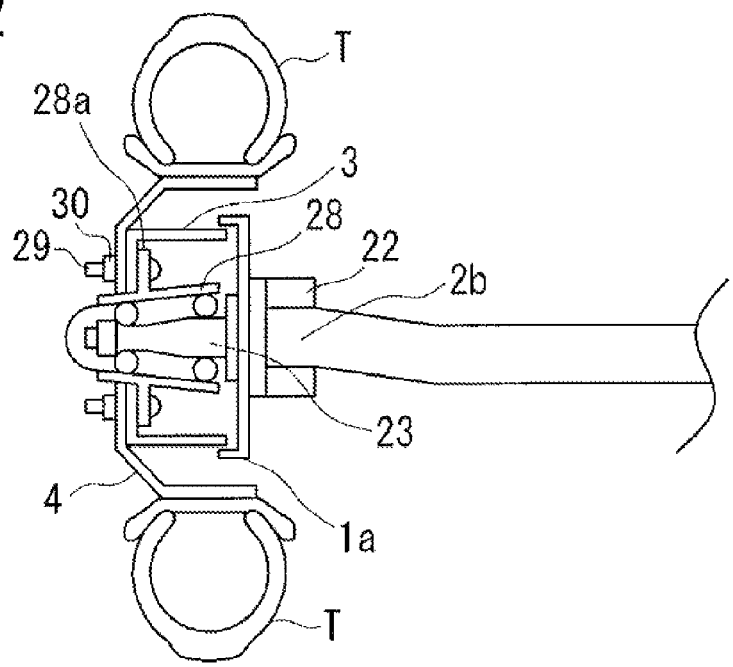
FIG. 2 is a diagram, for comparison, showing a cross-section of a principal part of a front wheel on which a generator is not installed.

FIG. 2 is an illustration which shows a cross-section of a principal part of a front wheel on which a generator is not installed and which is shown for comparison.

As shown in the illustration, a steering knuckle 22 is attached to a front wheel axle 2b. Furthermore, at the end portion of the front wheel axle 2b, a spindle 23 is disposed integrally with the steering knuckle 22, and the spindle 23 supports a hub (bearing) 28. The hub 28 is coupled integrally to the tire drum 3 and the tire wheel 4 through the use of, for example, bolts and nuts, via a hub flange 28a disposed at its outer periphery.

Figure 3:
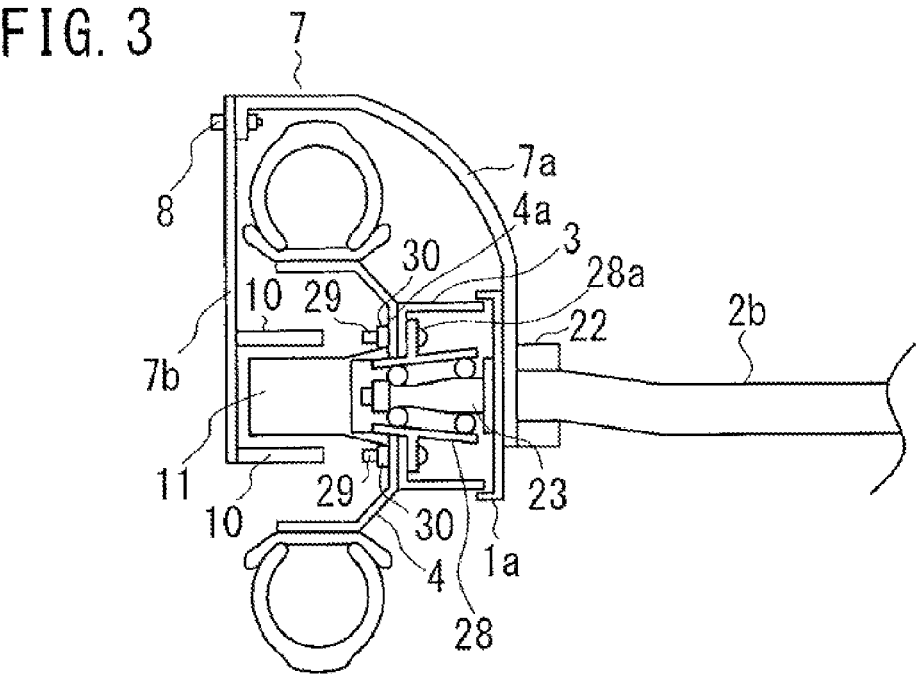
FIG. 3 is a partial cross-sectional view showing a generator attached to a front wheel according to another embodiment.

FIG. 3 is a partial cross-sectional view showing a generator attached to a front wheel according to another embodiment, and is a diagram showing a principal part when the generator is disposed on the front wheel of an automobile shown in FIG. 2. However, in the present embodiment, the tire wheel 4 is attached in the direction opposite to that in FIG. 2 so that its concave portion 4a faces a vehicle outside. The end portion (not shown) of the wheel axle 2b of the front wheels is coupled to the tire drum 3 and the tire wheel 4 via the hub (bearing) 28. In addition, at a position between the steering knuckle 22 attached to the front wheel axle 2b and the wheel-axle flange 1a, the inside arm 7a of the arm member 7 with the structure having been already described in relation to FIG. 1 is attached integrally to the steering knuckle 22.

In the concave portion 4a that opens toward the vehicle outside of the tire wheel 4, the rotor 11 is fixed integrally to the tire wheel 4 and concentrically to the spindle 23 with, for example, multiple sets of hub bolts 29 and hub nuts 30 which are arranged in the form of a circumference at regular intervals around the hub 28 accommodating the spindle 23. Furthermore, at the end portion of the outside arm 7b, facing the tire wheel 4, the stator 10 is annularly arranged to face the vehicle inside so as to surround the rotor 11.

By arrangement of the stator 10 and rotor 11 of the generator in this way, electricity is generated stably by the rotation of the front wheel at the time of running.

Figure 4:
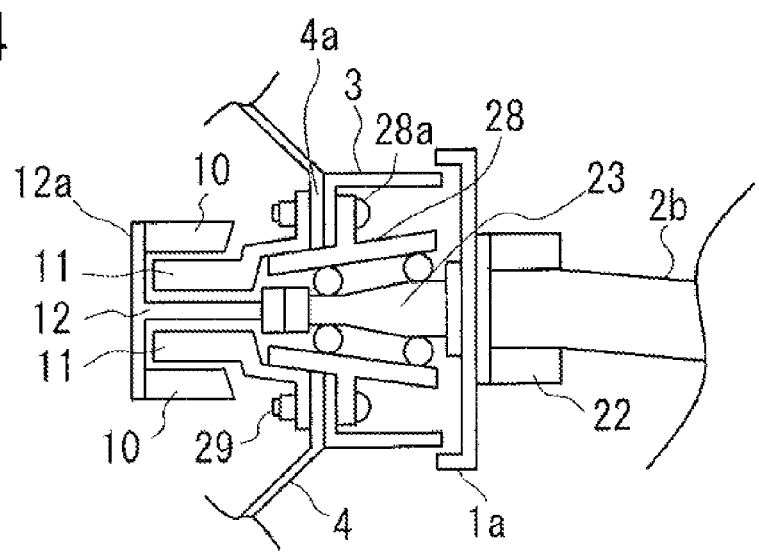
FIG. 4 is a partial cross-sectional view showing a generator attached to a front wheel according to still another embodiment.

FIG. 4 is a partial cross-sectional view showing a generator attached to a front wheel according to still another embodiment.

In the present embodiment, for example, the arm member 7 shown in FIG. 3 is not used. That is, in the present embodiment, the spindle 23 is provided integrally with the front wheel steering knuckle 22 at the end portion of the front wheel axle 2b, and into this, the wheel-axle flange 1a is fit. A pillar-shaped extension member 12 is attached to the spindle 23 so as to be concentrically with this. On the vehicle outside of this extension member 12, a disc-shaped plate 12a is formed integrally, and on the inner surface (vehicle inside surface) of the disc-shaped plate 12a, the stator 10 is annularly arranged so as to surround the rotor 11.

As with that shown in FIG. 3, in the concave portion 4a that opens toward the vehicle outside of the tire wheel 4, the rotor 11 is fixed integrally to the tire wheel 4 and concentrically to the spindle 23 through the use of, for example, multiple sets of hub bolts 29 and hub nuts 30 which are arranged in the form of a circumference at regular intervals so as to surround the hub 28 accommodating the spindle 23. Here, this rotor 11 is arranged such that an opening portion through which the extension member 12 for attaching a stator passes is formed at its center in its inside, and around it, the stator 10 is annularly arranged. The other structures are the same as those shown in FIG. 3.

In the present embodiment, when a vehicle runs and a wheel (tire T) rotates, the rotor 11 attached to the concave portion 4a of its tire wheel 4 through the use of the hub bolts 29 and the hub nuts 30 rotates in the inside of the stator 10 annularly arranged so as to surround the rotor 11 from its outside, whereby electricity generation is performed.

In the present embodiment, the arm member 7 is unnecessary, and all the structural members of the generator are accommodated in the central portion of the tire wheel 4. Accordingly, the present embodiment provides not only good appearance, but also, since the arm member 7 is not disposed in the vicinity of the tire T, there is no risk that the arm member 7 vibrates during running or bumps against some object so as to cause breakdown of the generator.

Figure 5:
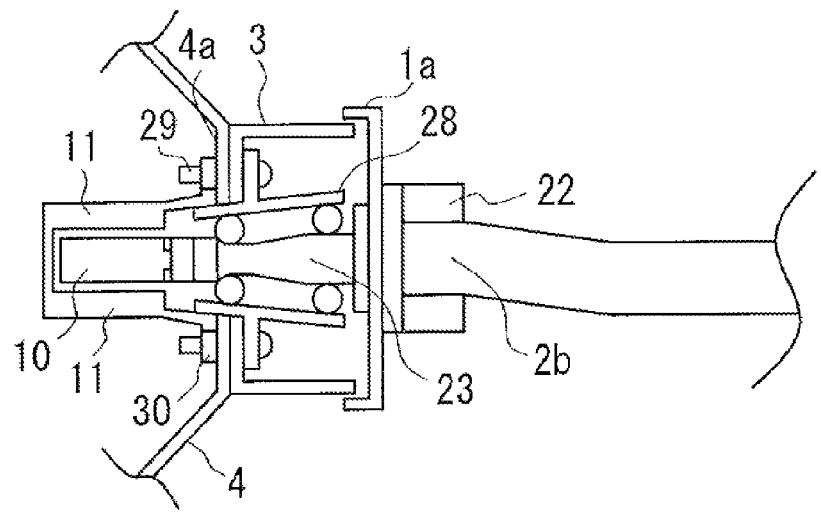
FIG. 5 is a partial cross-sectional view showing a generator attached to a front wheel according to still another embodiment.

FIG. 5 is a partial cross-sectional view showing a generator attached to a front wheel according to still another embodiment.

In the present embodiment, the extension member 12 shown in FIG. 4 is not used, and the stator 10 of the generator is directly coupled to the tip of the spindle 23 provided integrally with the front wheel steering knuckle 22. On the other hand, also in the present embodiment, in the concave portion 4a that opens toward the vehicle outside of the tire wheel 4, the rotor 11 of the generator is fixed integrally to the tire wheel 4 and concentrically to the spindle 23 through the use of, for example, multiple sets of hub bolts 29 and hub nuts 30 which are arranged in the form of a circumference at regular intervals so as to surround the hub 28 accommodating the spindle 23. Meanwhile, in the present embodiment, the rotor 11 shown in FIG. 5 is disposed so as to form a space configured to accommodate the stator 10 coupled to the spindle 23.

In the present embodiment, with the rotation of a wheel (tire T), the rotor 11 rotates around the stator 10, whereby electricity generation can be performed in a stable state.

Incidentally, for example, in the double tire of a truck or the like, the length of the arm member 7 becomes longer. In that case, in order to always maintain a constant space between the stator 10 attached to the tip of the arm member 7 and the rotor 11, it is necessary to increase the strength of the arm member 7 and its rigidity. However, if the strength or the like of the arm member 7 is increased, its weight increases, and thus there is caused another problem in which the weight cannot be reduced.

Then, next, description will be given of the embodiment in which this problem is coped with.

Figure 6:
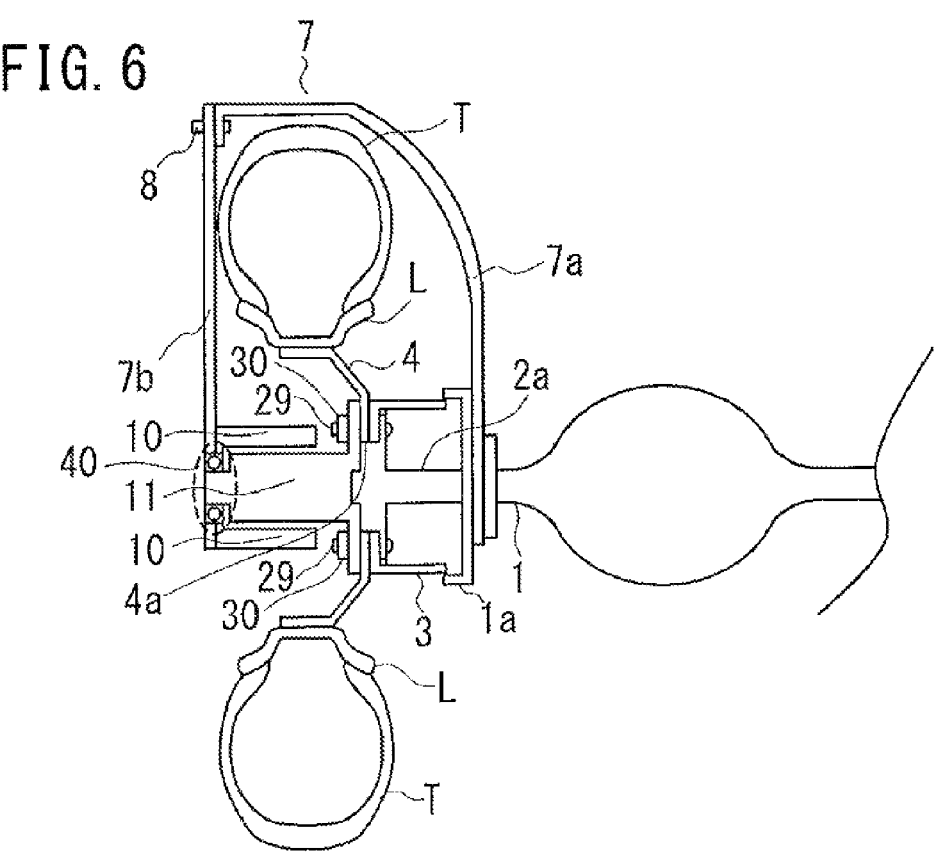
FIG. 6 is a partial cross-sectional view showing a generator attached to a rear wheel according to still another embodiment.

FIG. 6 is a partial cross-sectional view showing a generator attached to a rear wheel according to still another embodiment.

The rear wheel attaching structure shown in FIG. 6 is basically the same as that shown in FIG. 1. That is, the generator shown in FIG. 6 is different from that shown in FIG. 1 in that a bearing 40 configured to couple rotatably the vehicle outside end portion of the rotor 11 is provided at the end portion of the arm member 7 (outside arm 7b), and is the same as that in FIG. 1 in the other points.

In the present embodiment, as shown in the illustration, the outside arm 7b and the rotor 11 are made to cooperate with each other via the bearing 40, whereby the outside arm 7b is supported by the rotor 11 fixed to the tire wheel 4 and thus the arm member 7 is supported at both ends. Therefore, as compared with the case where the arm member 7 is supported at one end with the wheel-axle housing 1 as shown in FIG. 1, the arm member 7 is reinforced and supported so as to be immovable, whereby its strength is enhanced.

In the present embodiment, it is possible to suppress an increase in weight by the arm member 7.

Figure 7:
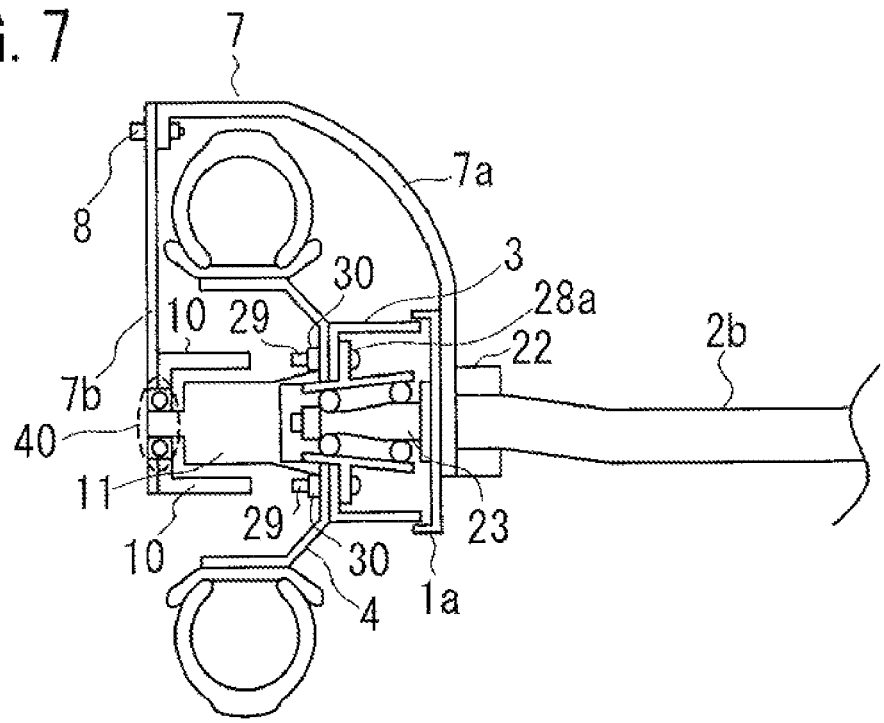
FIG. 7 is a partial cross-sectional view showing a generator attached to a front wheel according to still another embodiment.

FIG. 7 is a partial cross-sectional view showing a generator attached to a front wheel according to still another embodiment.

The generator shown in FIG. 7 is basically the same as that shown in FIG. 3. That is, the generator shown in FIG. 7 is different from that shown in FIG. 3 in that a bearing 40 configured to couple rotatably the vehicle outside end portion of the rotor 11 is provided at a position in the stator 10 annularly arranged at the end portion of the arm member 7 (outside arm 7b), and is the same as that in FIG. 3 in the other points.

Furthermore, its working effects are the same as those shown in FIG. 6.

Figure 8:
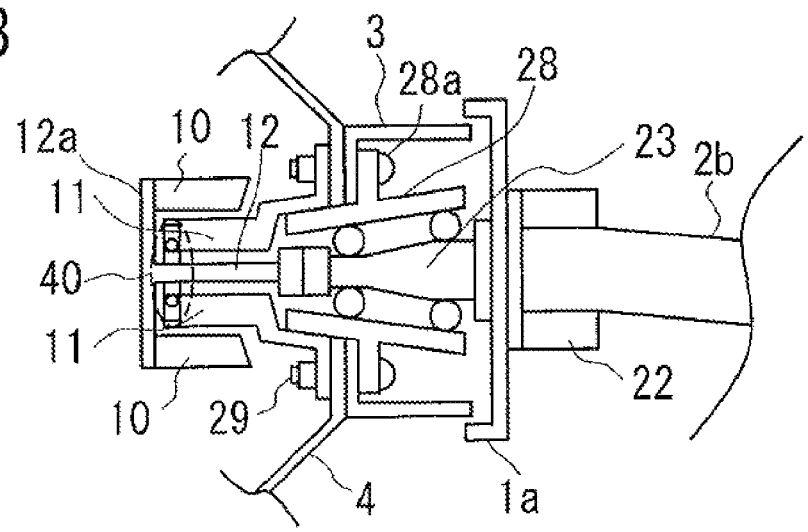
FIG. 8 is a partial cross-sectional view showing a generator attached to a front wheel according to still another embodiment.

FIG. 8 is a partial cross-sectional view showing a generator attached to a front wheel according to still another embodiment.

The generator shown in FIG. 8 is different from that shown in FIG. 4 in that the end portion of the pillar-shaped extension member 12 integrated with the stator 10 is coupled rotatably to the rotor 11 via this bearing 40, and is the same as that in FIG. 4 in the other points.

That is, the present embodiment is different from that shown in FIG. 4 in that, between the tip side of the extension member 12 and the tip portion of the rotor 11, as shown in FIG. 8, the bearing 40 is provided, and that the rotor 11 surrounded by the stator 10 is configured to rotate around the extension member 12, and is the same as that in FIG. 4 in the other points.

According to the present embodiment, since the end portion of the rotor 11 fixed to the tire wheel 4 and the end portion of the extension member 12 are coupled to each other via the bearing 40, a space between the stator 10 formed integrally with the extension member 12 and the rotor 11 is always maintained stably.

Figure 9:
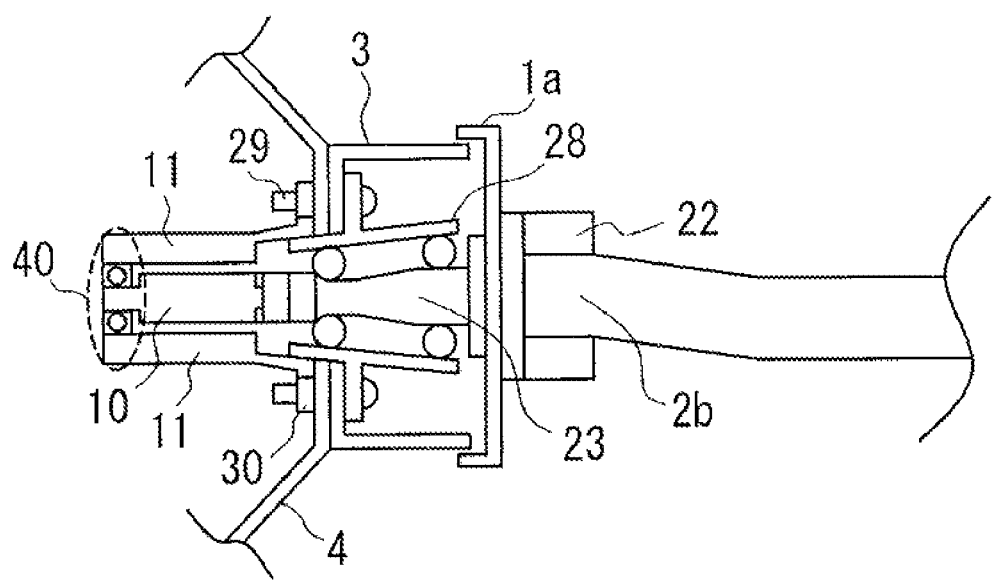
FIG. 9 is a partial cross-sectional view showing a generator attached to a front wheel according to still another embodiment.

FIG. 9 is a partial cross-sectional view showing a generator attached to a front wheel according to still another embodiment.

The generator shown in FIG. 9 is different from that shown in FIG. 5 in that the outer end portion of its stator 10 and the outer end portion of the rotor 11 are coupled to each other via the bearing 40, and is the same as that shown in FIG. 5 in other points.

Also in the present embodiment, since the outer end portion of the stator 10 and the outer end portion of the rotor 11 fixed to the tire wheel 4 are coupled to each other via the bearing 40 such that the rotor 11 is rotatable around the stator 10, a space between the stator 10 and the rotor 11 is always maintained stably.

Figure 10A:
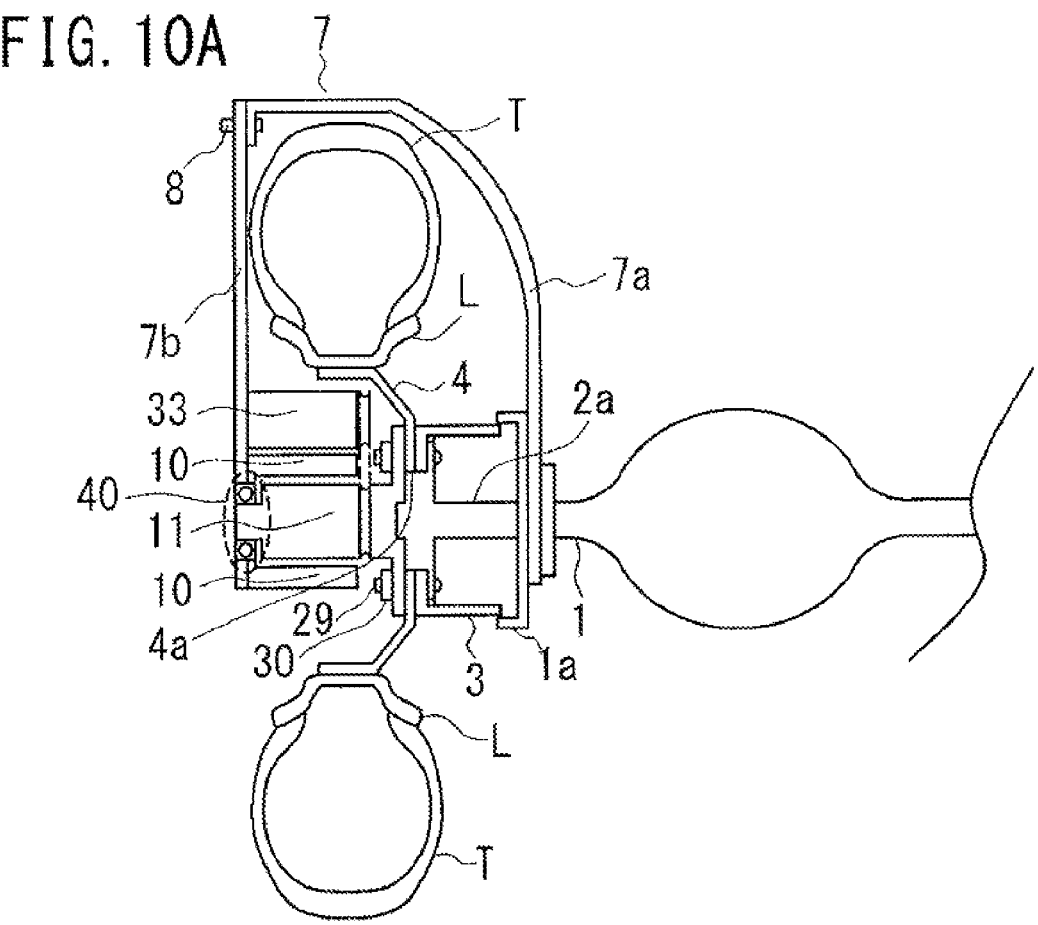
FIG. 10A is a partial cross-sectional view showing a generator attached to a rear wheel according to still another embodiment.
Figure 10B:
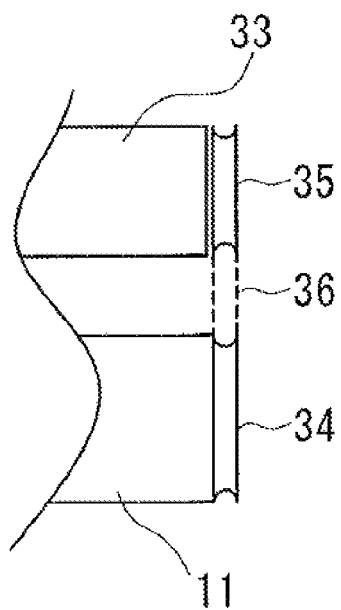
FIG. 10B is its partially-enlarged view.

FIG. 10A is a partial cross-sectional view showing a generator attached to a rear wheel according to still another embodiment, and FIG. 10B is its partially-enlarged view.

In addition to the structure of the generator shown in FIG. 6, the generator shown in FIG. 10A has a structure in which an auxiliary generator 33 is provided on the tire wheel 4 side of the arm member 7 (outside arm 7b) in the vicinity of the bearing 40 disposed at its end portion on the connection portion side with the arm member 7.

Here, the structure of the auxiliary generator 33 shown, in an enlarged manner, in FIG. 10B includes a rotor and a stator as with the generator already described, and on its one end side, a pulley 35 is installed in order to rotate the rotor. Furthermore, on the front wheel-axle side of the rotor 11, similarly, a pulley 34 is installed, and a belt 36 is installed between both the pulleys 34 and 35.

In the present embodiment, when a wheel rotates, the rotor 11 rotates together with the rotation, and the pulley 34 installed to the rotor rotates. The rotation of the pulley 34 is transmitted to the pulley 35 via the belt 36, and thus rotates the rotor of the auxiliary generator 33.

In the present embodiment, as compared with each of the above-mentioned generators, it becomes possible to increase a quantity of generated electricity by the addition of a quantity of generated electricity of the auxiliary generator.

Here, in the present embodiment, since the end portion of the arm member 7 (outside arm 7b) is coupled to the rotor 11 via the bearing 40, even if the auxiliary generator 33 is attached to the outside arm 7b, it does not happen that the outside arm 7b bends due to the weight of the auxiliary generator 33 during running, a space between the stator 10 and the rotor 11 changes, or the auxiliary generator 33 fluctuates during the running of wheels.

Figure 11A:
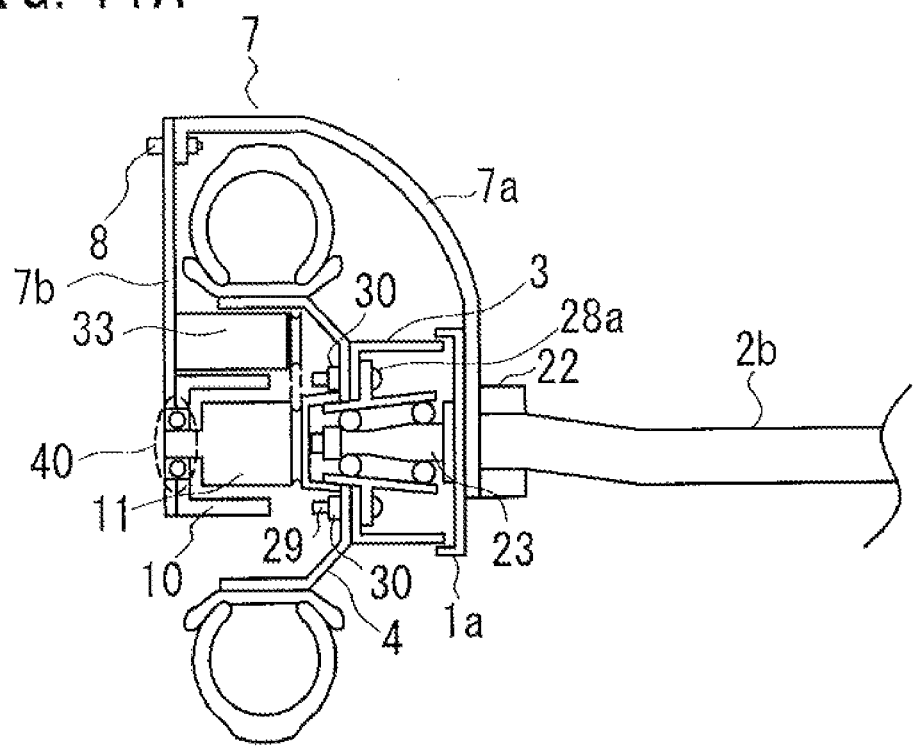
FIG. 11A is a partial cross-sectional view showing a generator attached to a rear wheel according to still another embodiment.
Figure 11B:
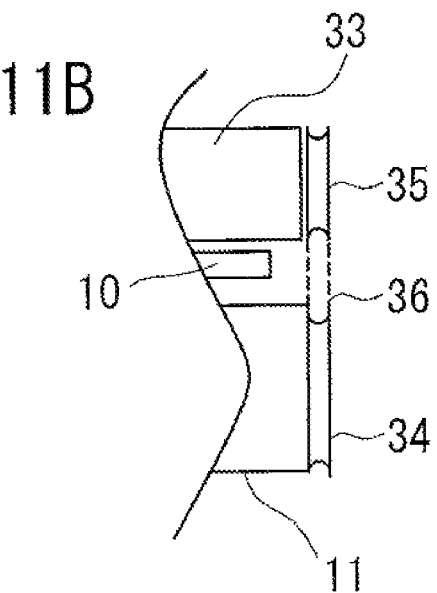
FIG. 11B is its partially-enlarged view.

FIG. 11A is a partial cross-sectional view showing a generator attached to a front wheel according to still another embodiment, and FIG. 11B is its partially-enlarged view.

In the attaching structure shown in FIG. 7, the generator shown in FIG. 11A has a structure in which the auxiliary generator 33 is further disposed on the tire wheel 4 side of the arm member 7 (outside arm 7b), in the vicinity of the bearing 40 disposed at its end portion.

Also in the present embodiment, the structure of the auxiliary generator 33 shown by being enlarged in FIG. 11B includes a rotor and a stator as with the already-described auxiliary generator 33, and at its one end side, a pulley 35 is installed in order to rotate the rotor. Furthermore, at the front wheel-axle side of the rotor 11, similarly, a pulley 34 is installed, and a belt 36 is installed between both the pulleys 34 and 35.

Further, also in the present embodiment, when a wheel rotates, the rotor 11 rotates along with it, the pulley 34 rotates with the rotation of the rotor 11, the rotation of the pulley 34 is transmitted to the pulley 35 via the belt 36, and thus electricity generation is performed by rotating the rotor of the auxiliary generator 33.

In the present embodiment, as compared with each of the above-mentioned generators, it becomes possible to increase a power generation amount by the addition of the power generation amount of the auxiliary generator.

Meanwhile, also in the present embodiment, since the end portion of the arm member 7 is coupled to the rotor 11 via the bearing 40, even if the auxiliary generator 33 is attached to the outside arm 7b, it does not happen that the outside arm 7b bends due to the weight of the auxiliary generator 33 during running, a space between the stator 10 and the rotor 11 changes, or the auxiliary generator 33 undergoes a change during the running of the wheel.

Meanwhile, the above description has been made on the assumption that the vehicle is an automobile. However, the present invention is applicable to the other vehicles without being limited to the automobile. Nevertheless, the front wheel of a three-wheeled vehicle or a two-wheeled vehicle such as a motorcycle or a bicycle runs, via a bearing arranged at the outer periphery side of a wheel axle, by making the wheel axle as a rotation axle, and by rotating a wheel around it. Accordingly, it is not possible to lead the rotation of the wheel directly to electricity generation. Then, description is given of a type improved in terms of this point.

Figure 12:
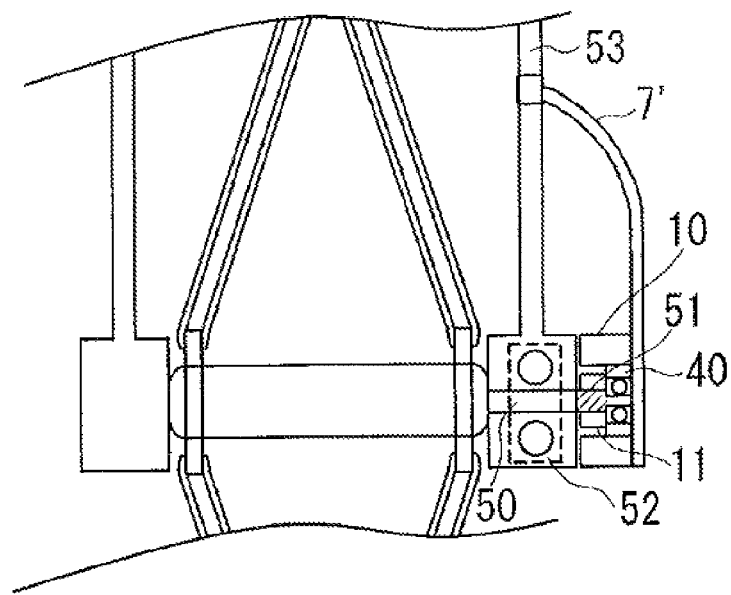
FIG. 12 is a partial cross-sectional view showing a generator attached to a wheel axle of a two-wheeled vehicle according to still another embodiment.

FIG. 12 is a partial cross-sectional view showing a generator attached to a wheel axle of a two-wheeled vehicle according to still another embodiment.

Here, as shown in the illustration, in order to enable a wheel-axle electricity generation, a wheel axle 50 and a wheel are fixed into one body, and when the wheel rotates, the wheel axle 50 is configured to rotate together with the wheel. In this structure, the wheel axle 50 of the two-wheeled vehicle (here, a bicycle) is extended, and on its tip, a screw groove 51 is provided, and a rotor 11 is attached by being screwed into the screw groove 51. Together with it, one end portion of an arm member 7' similar to the already-described arm member 7 is attached, in an appropriate manner, to one suitable portion of vehicle body forks 53 supported via a bearing 52 for the rotating wheel axle 50. Here, a stator 10 annularly arranged at the other end portion of the arm member 7' is disposed so as to surround the rotor 11, and a bearing 40 configured to couple rotatably the end portion of the screw groove 51 is provided at the central portion of the stator 10 annularly arranged. Because of this, the rotor 11 rotates relative to the stator 10 annularly arranged around it along with the rotation of the wheel axle 50 at the time of running of the two-wheeled vehicle or the bicycle, whereby electricity generation can be performed.

Furthermore, also in a wheel-axle electricity generation in a railroad vehicle or the like, in the same method as that in the already-described rear-wheel-axle electricity generation of the automobile, a generator is assembled such that a rotor of the generator is installed on a wheel axle and an arm member for installing the stator of the generator is installed from a portion corresponding to a wheel-axle housing in the case of an automobile, whereby electricity generation can be performed. Also in the wheel-axle electricity generation in the railroad, in order to avoid the problem in which an arm member is weak and comes in contact with a rotor of a generator, it is preferable that in the arm member, a plurality of arms is radially arranged so as to increase its strength.

Meanwhile, each of the above-mentioned generators is connected to a storage battery not shown, and generated electricity may be used as it is or accumulated once in the storage battery.

REFERENCE SIGNS LIST

1 . . . wheel-axle housing, 1a . . . wheel-axle flange, 2a . . . Rear wheel axle, 2b . . . Front wheel axle, 3 . . . Tire drum, 4 . . . Tire wheel, 4a . . . Concave portion of a tire wheel, 7, 7' . . . Arm member, 7a . . . Inside arm, 7b . . . Outside arm, 8 . . . Bolts and nuts (for coupling an inside arm and an outside arm), 10 . . . Stator (of a generator), 11 . . . Rotor (of a generator), 12a . . . Disc-shaped plate, 12 . . . Extension member of a spindle, 22 . . . Steering knuckle, 23 . . . Spindle, 28 . . . Hub, 28a . . . Hub flange, 29 . . . Hub bolt, 30 . . . Hub nut, 33 . . . Auxiliary generator, 34, 35 . . . Pulley, 36 . . . Belt, 40 . . . Bearing, L . . . Rim, T . . . Tire.

The invention claimed is:

1. A wheel-axle generator equipped with a rotor configured to rotate with rotation of a tire wheel and a stator arranged around the rotor, comprising:
    the rotor fixed to a concave portion that opens toward an outside of the tire wheel; and
    an arm member having an inside arm having one end attached to a wheel-axle housing or a steering knuckle, that extends so as to stride over a wheel having the tire wheel and an outside arm connected at one end side thereof to the other end of the inside arm, on a side of an outer surface of the wheel, extending parallel to the outer surface of the wheel up to a central portion of the wheel;
    wherein:
    the stator annularly arranged so as to surround the rotor is directly connected on the other end side of the outside arm and is attached to the wheel-axle housing or the steering knuckle via the arm member,
    a bearing configured to couple rotatably the rotor is directly connected on the other end side of the outside arm,
    the arm member is supported at the other end of the outside arm supported by the rotor and the one end of the inside arm supported by the wheel-axle housing or the steering knuckle,
    an auxiliary generator is directly connected on a surface of the outside arm, facing the wheel,
    a pulley is provided integrally with the rotor fixed to the tire wheel, and
    a belt is installed between the pulley and a pulley for driving a rotor of the auxiliary generator.

\* \* \* \* \*